United States Patent [19]
Mahoney et al.

[11] Patent Number: 5,544,267
[45] Date of Patent: * Aug. 6, 1996

[54] USING A CATEGORY TO ANALYZE AN IMAGE SHOWING A GRAPHICAL REPRESENTATION

[75] Inventors: James V. Mahoney, San Francisco, Calif.; Satyajit Rao, Cambridge, Mass.

[73] Assignee: Xerox Corporation, Stamford, Conn.

[*] Notice: The portion of the term of this patent subsequent to Nov. 24, 2013, has been disclaimed.

[21] Appl. No.: 158,063

[22] Filed: Nov. 24, 1993

[51] Int. Cl.⁶ .................................................. G06K 9/20
[52] U.S. Cl. .................... 382/317; 382/203; 382/224; 382/276; 358/400; 358/402
[58] Field of Search ........................ 382/36, 25, 61, 382/9, 11, 317, 224, 276, 203; 358/402, 400

[56] References Cited

U.S. PATENT DOCUMENTS

| | | | |
|---|---|---|---|
| 4,110,736 | 8/1978 | Kono | 382/25 |
| 4,503,557 | 3/1985 | Maeda | 382/36 |
| 5,121,442 | 6/1992 | Togawa et al. | 382/25 |
| 5,148,522 | 9/1992 | Okazaki | 395/161 |
| 5,159,647 | 10/1992 | Burt | 382/36 |
| 5,202,933 | 4/1993 | Bloomberg | 382/9 |
| 5,228,100 | 7/1993 | Takeda et al. | 382/61 |
| 5,263,097 | 11/1993 | Katz et al. | 382/36 |
| 5,282,052 | 1/1994 | Johnson et al. | 358/402 |
| 5,392,130 | 2/1995 | Mahoney | 358/400 |

OTHER PUBLICATIONS

Patent Abstracts of Japan, vol. 017, No. 129(P–1503), 18 Mar. 1993 & JP–A–04309186 (Matsushita Electric Ind Co Ltd) 30 Oct. 1992. *abstract*.

Patent Abstracts of Japan, vol. 016, No. 308(P–1381), 7 Jul. 1992 & JP–A–04 084377 (Ricoh Co Ltd) 17 Mar. 1992. *abstract*.

Ricoh Imagio MF530 Series General Catalog, Ricoh K. K., 1992, with English translation of cover page and pp. 1–2 and 23–24.

The Apple Catalog, Fall 1993, pp. 1 and 4–5.

Helm, R. Marriott, K., Odersky, M., "Building Visual Language Parsers," in Proceedings of CHI, 1991 (New Orleans, Louisiana, Apr. 29–May, 2 1991), ACM, New York, 1991, pp. 105–112.

Suenaga, Y., and Nagura, M., "A Facsimile Based Manuscript Layout and Editing System by Auxiliary Mark Recognition," 5th International Conference on Pattern Recognition, vol. 2, IEEE, 1980, pp. 856–858.

Primary Examiner—Jose L. Couso
Assistant Examiner—Anh Hong Do

[57] ABSTRACT

Image data define an image that shows an input graphical representation whose configuration represents information. The image can show a sketch, for example. The image data are used to obtain category data indicating a category of graphical representations. For example, the category data could indicate any of X-Y graph, directed graph, undirected graph, bar graph, pie chart, line graph, scatter plot, circuit diagram, flow chart, Venn diagram, state-transition diagram, tree, table, matrix, or array. The category data could also indicate a specific category within a generic category such as bar graph or pie chart. The category data can be obtained by determining whether the graphical representation satisfies a constraint on each category. Each category's constraint may be applied to parts of the input image that meet a feature candidate criterion, which may be different for each specific category in a generic category, even though the feature candidates must satisfy another constraint that is the same for all specific categories in the generic category. The category data are then used to obtain content data indicating information represented by the input graphical representation's configuration, and an output image is obtained with an output graphical representation, with a configuration representing the information indicated by the content data. The output graphical representation can be more precisely formed than the input graphical representation. The output graphical representation can be in the same generic category as the input graphical representation, but possibly in a different specific category, or it can be in a different generic category.

25 Claims, 10 Drawing Sheets

USING A CATEGORY TO ANALYZE AN IMAGE SHOWING A GRAPHICAL REPRESENTATION

BACKGROUND OF THE INVENTION

The present invention relates to techniques for analyzing data defining an image.

Takeda et al., U.S. Pat. No. 5,228,100, describe techniques for producing from a document image a form display with blank fields and a program to input data to the blank fields. As shown and described in relation to FIG. 1, a document processing apparatus includes a processor, an image input device for storing image data in memory, a printer for achieving a print operation of data from memory, and memory for programs and for data items. As shown and described in relation to FIG. 2, a document format recognition step recognizes an image of a document format to determine a format information item, a document construction step generates document content data associated with the document format, the system creates output data for the document data based on the resultant format and content data, and a document output step prints the output document data on a print form or stores it in a data file. FIGS. 8–70, 87, and 88 relate to a document form or format recognition step. As shown and described in relation to FIGS. 8, 9-a, and 9-b, a physical structure recognition step recognizes a physical structure as a format of a document, with physical structure designating only graphic structure such as the layout of line segments, letters, arcs, or the like, but not explicitly designating any meaning of a document. An area is subdivided into a plurality of blocks, and the system judges whether or not a selected block has a type representing a table. The judgement may be accomplished such that, for example, when the block has a horizontal width and a vertical height respectively exceeding predetermined threshold values, the block is determined to belong to a table. If the block type is determined to be other than a table, elements of the construction are recognized. Otherwise, the block is subdivided into subblocks or subregions and a subblock is selected and recognized.

Bloomberg, U.S. Pat. No. 5,202,933, describes techniques for segmenting text and graphics. Col. 1 lines 38–40 indicates that it is important to send only graphics regions to graphics recognizers. As shown and described in relation to FIG. 1B, one technique eliminates vertical rules and lines; then eliminates horizontal rules and lines; then solidifies remaining text regions to produce a separation mask that can be used to separate text and graphics images. As shown and described in relation to FIGS. 12A–12D, an image contains text and line graphics, and the line graphics contain minor amounts of text; in the separated text image, all of the line graphics and its associated text have been removed, and all of the text blocks remain; in the separated graphics image, all of the text blocks have been removed, and the line graphics and its associated labels remain.

SUMMARY OF THE INVENTION

The invention is based on the observation that a graphical representation can be viewed as including two types of information. One type of information, referred to herein as "category", indicates one of a number of accepted categories of graphical representations, such as directed graphs, bar graphs, pie charts, and so on. The other type of information, referred to herein as "content", indicates the information represented by a particular instance of one of the accepted categories.

In this respect, graphical representations are different from simple graphical elements, such as lines or curves, whose graphical shapes include intrinsic information about themselves, such as length, thickness, curvature, and so forth, but are not ordinarily used to represent information extrinsic to themselves unless combined to form a graphical representation in one of the accepted categories. Graphical representations are also different from symbols, such as characters and numbers, whose graphical shapes are typically used to communicate only a category. In other words, the spatial relations among elements in a graphical representation, referred to herein as its "configuration", provide an accepted way of communicating information other than a category.

The manner in which a graphical representation is interpreted depends on its category. Therefore, the category of a graphical representation can be used to obtain information about how to extract its content. The criteria used to distinguish each category are collectively referred to herein as the category's "model". The models of a set of categories of graphical representations can be chosen so that the categories can be reliably distinguished and efficiently extracted.

The invention is further based on the discovery of a technique that makes use of this observation. The technique responds to an input image that shows an input graphical representation. The technique uses the image to obtain a category of graphical representations and then uses the category to obtain information represented by the input graphical representation's configuration. Then the technique obtains an output image showing an output graphical representation in the category and with a configuration representing the information.

The technique can be implemented, for example, by receiving input image data defining an input image that shows an input graphical representation. The input image can, for example, show a sketch. The technique can use the input image data to obtain category data indicating a category of graphical representations. For example, the category data could indicate one of a set of categories that includes X-Y graph, vertical bar graph, two categories of pie chart, and directed graph; or the category data could indicate one of a set of categories that includes two or more categories of a number of generic category groups, such as two or more categories of bar graph and two or more categories of pie chart; or, more generally, the category data could indicate one of a set of categories that includes directed graph, undirected graph, bar graph, pie chart, line graph, scatter plot, circuit diagram, flow chart, Venn diagram, state-transition diagram, tree, table, matrix, and array. The technique can use the category data to obtain content data indicating information represented by the input graphical representation's configuration. The technique can use the content data to obtain output image data defining an output image that includes an output graphical representation in the indicated category and with a configuration representing the indicated information.

The technique can obtain a category by determining whether the input image shows a graphical representation that satisfies a constraint on each of a number of categories. The constraint for each category may be applied to parts of the input image that meet a feature candidate criterion. Each category may have a feature candidate criterion, and the feature candidate criteria may differ among specific categories in a generic category, even though the same constraint must be satisfied for all the specific categories in the generic category.

The output graphical representation can be a more precisely formed version of the input graphical representation in the same generic category, but possibly in a different specific category, or in a different generic category. The output image data can be provided to image output circuitry, which could, for example, be connected for providing facsimile transmission. The input image data could similarly be received from image input circuitry connected for receiving facsimile transmissions.

The technique can be implemented in a machine that includes image input circuitry and stored data indicating image processing instructions. The image input circuitry can receive input image data defining an image that shows an input graphical representation. The machine's processor can execute the image processing instructions.

In executing the image processing instructions, the processor can receive the input image data from the image input circuitry; use the input image data to obtain category data indicating a category of graphical representations; and use the category data to obtain content data indicating information represented by the configuration of the input graphical representation. Then the machine's processor can use the content data to obtain output image data defining an output image that includes an output graphical representation in the indicated category or another category and with a configuration representing the indicated information. The machine can be a high-speed image processing server that responds to image processing requests from a network to which it is connected.

A software product implementing the invention can include a storage medium and data stored by the storage medium. The software product can be used in a machine that includes image input circuitry. The data stored by the storage medium can include image processing instructions the machine's processor can execute.

In executing the image processing instructions, the processor can receive input image data from the image input circuitry; the input image data define an image that shows an input graphical representation with a configuration. The processor can use the input image data to obtain category data indicating a category of graphical representations. The processor can then use the category data to obtain content data indicating information represented by the configuration of the input graphical representation. Then the processor can use the content data to obtain output image data defining an output image that includes an output graphical representation in the indicated category and with a configuration representing the indicated information.

The technique described above is advantageous because it provides model-based analysis of graphical representations. As a result, if a graphical representation's category can be recognized from its overall graphical configuration, a great deal of information about how to extract its content is known. This in turn makes it possible to produce a more precisely formed version of a sketch of a graphical representation; to provide an output image showing the content of a graphical representation in a different category of graphical representations; or to provide control signals to a system based on a graphical representation. From a simple sketch, a complex representation can be obtained. In addition, the technique can be easily extended to additional categories of graphical representations.

The following description, the drawings, and the claims further set forth these and other aspects, objects, features, and advantages of the invention.

DETAILED DESCRIPTION

A. Conceptual Framework

Figure 1:
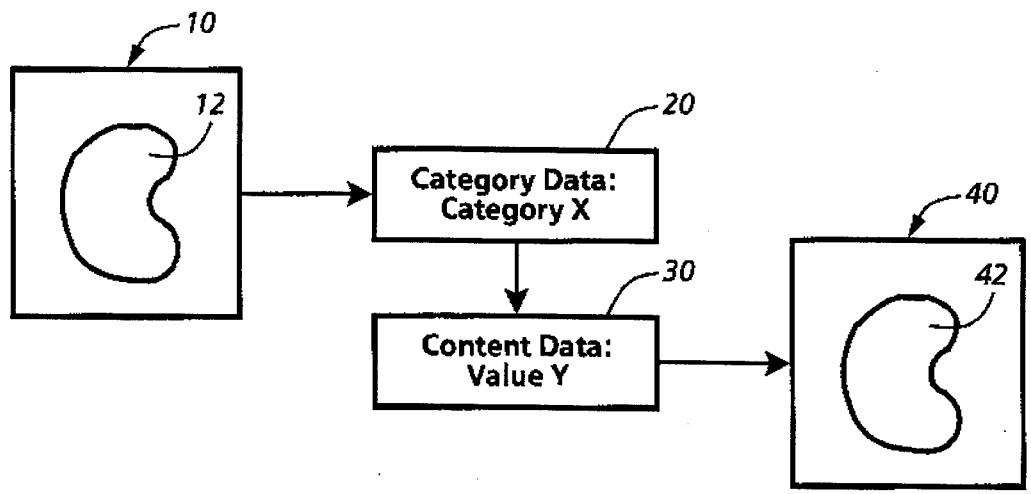
FIG. 1 is a schematic diagram showing how an image showing a graphical representation can be used to obtain category data, content data, and data defining an output image showing another graphical representation whose configuration represents the same content.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations.

A "control signal" is a signal provided to a machine or other system that can cause a change in the system's state, such as by changing the way in which the system operates. In executing a set of instructions, a processor may, for example, provide control signals to internal components within the processor and to external components connected to the processor, such as input/output devices.

A signal "requests" or "is a request for" an event or state when the signal can cause occurrence of the event or state.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An item of data "identifies" or "is an identifier of" one of a set of identifiable items if the item of data is one of a set of items of data, each of which can be mapped to at most one of the identifiable items.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of data.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of physical light. An "image set" is a set of one or more images.

When an image is a pattern of physical light in the visible portion of the electromagnetic spectrum, the image can produce human perceptions. The term "graphical feature", or "feature", refers to any human perception produced by, or that could be produced by, an image.

An image "shows" a feature when the image produces, or could produce, a perception of the feature. An image set "shows" a feature when the image set includes one or more images that, separately or in combination, show the feature. An item of data "defines" a feature when the item defines an image set that shows the feature.

A "graphical representation" is a graphical feature that includes elements that are spatially related in a configuration that represents information.

An image may be divided into "segments," each of which is itself an image. A segment of an image may be of any size up to and including the whole image.

An image or image set may be analyzed into "parts," each of which is smaller than the whole image or image set. Each part includes one or more segments of the image or segments of images in the image set.

An item of data "defines" an image when the item of data includes sufficient information to produce the image. For example, a two-dimensional array can define all or any part of an image, with each item of data in the array providing a value indicating the color of a respective location of the image.

A "data image" is an item of data defining an image.

An item of data "defines" an image set when the item of data includes sufficient information to produce all the images in the set.

An image or image set "includes" information indicating a thing, an event, or a characteristic if an item of data indicating the thing, event, or characteristic can be obtained by operating on an item of data defining the image or image set.

A "data transmission" is an act that physically transmits data from one location to another. A "facsimile transmission" is a data transmission in which the transmitted data define an image set according to a standard format. An "image destination" is a machine or other destination to which data defining an image can be transmitted. A "fax machine" is a machine with circuitry that can receive and provide facsimile transmissions. Therefore, the telephone number of a fax machine is an example of information that indicates an image destination.

A "marking medium" is a physical medium on which a human can produce a pattern of marks by performing marking actions or by performing actions that modify marks, such as erasing, wiping, or scratching actions. Common examples of marking media include sheets of paper and plastic, although humans can produce patterns of marks on an enormous variety of media. As used herein, "marking medium" covers one or more distinct units of a medium on which, together, a human has produced a pattern of related marks. For example, a set of paper pages that form a handwritten letter would be a single marking medium. Also, as used herein, "marking medium" includes a marking surface of an electronic device that can sense marks, such as a tablet, a touch- or signal-sensitive display, or another pen- or stylus-based input device.

A human "marks" a marking medium or "makes a mark on" a marking medium by performing any action that produces or modifies marks on the marking medium; a human may mark a marking medium, for example, with marking, stamping, erasing, wiping, or scratching actions.

A human makes a mark "by hand" when the human holds an instrument in a hand and moves the instrument across or against the surface of a marking medium to make the mark. The instrument could, for example, be a pen, a pencil, a stylus, a dry marker, a crayon, a brush, a stamp, an eraser, and so forth.

Marks are made "by a machine under control of a human" when the human performs actions that cause the machine to make the marks. The machine could, for example, be a typewriter, a printer, a copier, a fax machine, and so forth.

A "human-produced image" is an image that shows marks made by hand by a human, by a machine under control of a human, or in some other way in which a human can provide marks.

The term "mark" includes a single mark and also plural marks that together form a pattern of marks.

A mark "indicates" a thing, an event, or a characteristic when the presence or shape of the mark depends on the existence or occurrence of the thing, event, or characteristic or on a measure of the thing, event, or characteristic. For example, a mark can indicate a boundary.

A "version" of a first image is a second image produced using an item of data defining the first image. The second image may be identical to the first image, or it may be modified by loss of resolution, by changing the data defining the first image, or by other processes that result in a modified version.

Each location in an image may be called a "pixel." In an array defining an image in which each item of data provides a value, each value indicating the color of a location may be called a "pixel value." A pixel's value in an image that is a version of another image may indicate an attribute of a region of the other image that includes the pixel.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

A "connected component" or "blob" is a set of pixels within a data array defining an image, all of which are connected to each other through an appropriate rule such as that they are neighbors of each other or are both neighbors of other members of the set. A connected component of a binary form of an image can include a connected set of pixels that have the same binary value, such as black. A "bounding box" for a connected component is a rectangle just large enough to include all the pixels in the connected component, and can be specified by coordinates.

A "constraint" on parts of images or of image sets or on features shown by images or by image sets is a requirement or other limitation that the parts or features must satisfy.

An operation uses data to "determine" whether a proposition is true if the operation uses the data to obtain other data indicating whether the proposition is true. For example, an operation can use data defining an image to determine whether parts of the image satisfy a constraint, in which case the operation will obtain data indicating whether the image includes parts that satisfy the constraint.

A criterion is an example of a constraint. If a criterion "requires" a part of an image or of an image set with a characteristic or that has a characteristic, only parts with the characteristic or that have the characteristic meet the criterion.

A first item of data is produced by "applying a criterion" to a second item of data when the first item indicates whether the second item meets the criterion. An operation that applies a criterion produces such an item of data.

A criterion can be "applied" to a connected component or other part of an image or of an image set by applying the criterion to an item of data defining the image in a manner that depends on the connected component or other part. A connected component or other part of an image or of an image set "meets a criterion" if application of the criterion to the part produces an item of data indicating that the part meets the criterion. Numerous criteria can be applied to connected components and other parts of an image or of an image set. For example, a criterion can require a connected component to enclose more pixels or less pixels than the pixels in the connected component; a criterion can require a connected component to be the connected component nearest to another connected component; or a criterion can require a connected component to have a length that is greater than its distance to another connected component.

An operation includes a "sequence of iterations" when the operation includes a sequence of substantially similar sub-operations, each referred to as an "iteration," where each iteration after the first uses starting data produced by the preceding iteration to obtain ending data. Each iteration's ending data can in turn be used by the following iteration. A "change occurs" during an iteration if the iteration's ending data is different than its starting data; an iteration during which no change occurs can be the last iteration, because no change will occur during further iterations.

A sequence of iterations "propagates" a constraint if each iteration includes an operation that determines whether items indicated by its starting data satisfy the constraint, and obtains ending data that indicates only the items that satisfy the constraint. For example, if the starting data and ending data define images, the ending data could define an image that includes only the parts of the starting image that satisfy the constraint.

An operation uses data to "determine" whether a proposition is true if the operation uses the data to obtain other data indicating whether the proposition is true. For example, an operation can use data defining an image showing a graphical feature to determine whether the graphical feature satisfies a constraint, in which case the operation will obtain data indicating whether the graphical feature satisfies the constraint.

"Image input circuitry" is circuitry for obtaining data defining images as input.

An "image input device" is a device that can receive an image and provide an item of data defining a version of the image. A "scanner" is an image input device that receives an image by a scanning operation, such as by scanning a document. "User input circuitry" or "user interface circuitry" is circuitry for providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth. Signals from user input circuitry may include a "request" for an operation, in which case a system may perform the requested operation in response.

"Image output circuitry" is circuitry for providing data defining images as output.

An "image output device" is a device that can provide output defining an image.

A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

A "printer" is an image output device that provides an output image in the form of marks on a marking medium.

A "category of graphical representations" is an accepted category of graphical representations, a number of which are mentioned below. In general, graphical representations in each category can have one of a set of configurations or spatial relations between elements within a graphical representation. Each graphical representation in a category of graphical representations thus has a configuration that represents information in a way that is characteristic of the category.

The term "content" refers to information represented by a graphical representation's configuration. If the graphical representation is an instance of one of the accepted categories of graphical representations, the configuration represents the information in the category's characteristic way.

A "structure" is a graphical feature that includes other graphical features that are perceptible as interrelated.

A "node-link structure" is a structure that includes graphical features that can be distinguished into "nodes" and "links" with each link relating two nodes to each other or relating a node to itself. Examples of node-link structures include directed graphs, undirected graphs, trees, flow charts, circuit diagrams, and state-transition diagrams.

A "parallel length graph" is a graphical representation in which a number of features that are approximately parallel have lengths proportional to values they represent. The following categories of graphical representations are examples of parallel length graphs: bar graphs, histograms, Gantt charts, timing diagrams, and time lines.

A "proportioned parts graph" is a graphical representation in which a feature defines a number of segments, with each segment representing a part of a whole, arid with each segment having a size that bears approximately the same proportion to the feature as the part it represents bears to the whole. The most common category of graphical representation that is an example of proportioned parts graphs is the pie chart. In one type of bar graph, referred to herein as a "whole bar graph" or "segmented bar graph," each bar is a proportioned parts graph.

A "row/column representation" is a graphical representation that includes rows and columns and represents information for row/column combinations. The following categories of graphical representations are examples of row/column representations: tables, matrices, arrays, calendars, two-dimensional connection diagrams, puzzles such as crossword puzzles, or game diagrams such as chess or checkers diagrams, go game diagrams, or ticktacktoe games.

A "perimeter relationship representation" is a graphical representation in which perimeters represent distinctions. Each perimeter represents a distinction between items that fall within a set or category and items that fall outside the set or category. The perimeters enclose areas in a way that indicates a relationship among the distinctions they represent. One common type of perimeter relationship representations is the Venn or set membership diagram; another is an isometric map, such as a map with lines of equal elevation, equal barometric pressure, and so forth; some statecharts, organization charts, and block-structured program diagrams are perimeter relationship representations.

A "two-dimensional graph" is a graphical representation in which two parameters are represented implicitly or explicitly as orthogonal dimensions, within which each position represents a pairing of values for the parameters, and within which features are positioned to indicate relationships to pairings of values of the parameters or relationships between pairs of values of the parameters. The following categories of graphical representations are examples of two-dimensional graphs: line graphs, scatter plots, and certain kinds of maps. Many two-dimensional graphs fall into the category of "X-Y graphs," meaning a graphical representation with two perpendicular axes indicating orthogonal dimensions.

B. General Features

Figure 2:
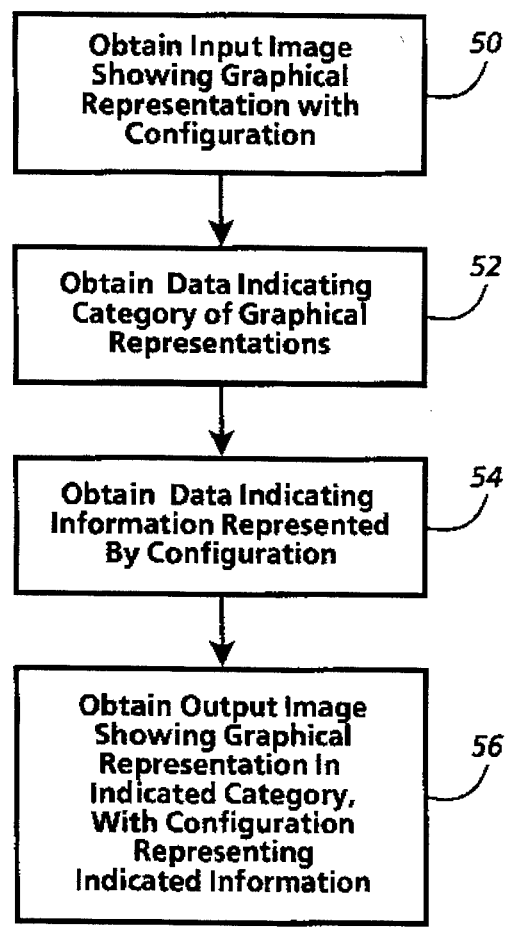
FIG. 2 is a flow chart' showing general acts in using data defining an image showing a graphical representation to obtain category data, content data, and data defining an output image showing another graphical representation whose configuration represents the same content.
Figure 3:
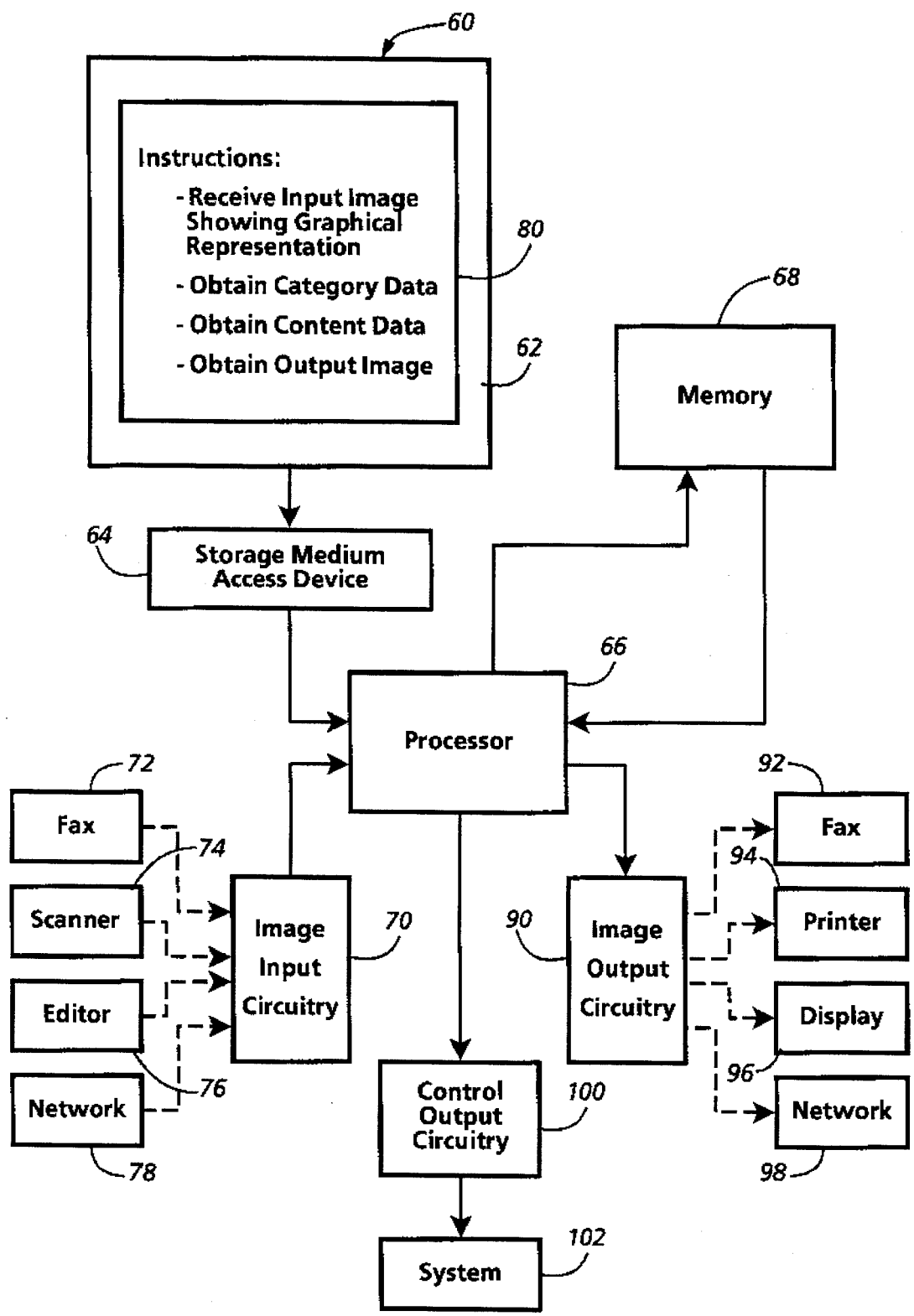
FIG. 3 is a schematic block diagram showing general components of a software product and a machine in which the software product can be used to implement the general acts in FIG. 2.

FIGS. 1–3 show general features of the invention. FIG. 1 shows schematically how an image of a graphical representation can be used to obtain category data, content data, and data defining an image of another graphical representation with a configuration representing the content. FIG. 2 shows general acts in using an image of a graphical representation to obtain category data, content data, and data defining an image of another graphical representation with a configuration representing the content. FIG. 3 shows general components of a software product and of a machine in which it can be used.

In FIG. 1, input image 10 shows graphical representation 12. Input image 10 can be a human-produced image, and graphical representation 12 can be made, for example, by marking a sheet of paper or other marking medium to obtain a sketch. A machine receiving data defining input image 10 can respond by automatically obtaining category data 20 indicating that input image 10 shows a graphical representation in category X. Then the machine can automatically use category data 20 to obtain content data 30 indicating that graphical representation 12 has a configuration representing value Y. Then the machine can use content data 30 to obtain data defining output image 40, which shows graphical representation 42, in category X and representing value Y.

The general acts in FIG. 2 begin in box 50 by obtaining input image data defining an input image that shows an input graphical representation. In response, the act in box 52 uses the input image data to obtain category data indicating a category of graphical representations. The act in box 54 then uses the category data to obtain content data indicating information represented by the configuration of the input graphical representation. Then the act in box 56 uses the content data to obtain output image data defining an output image that includes an output graphical representation, in the indicated category or in another category, with a configuration representing the indicated information.

FIG. 3 shows software product 60, an article of manufacture that can be used in a system that includes components like those shown in FIG. 3. Software product 60 includes data storage medium 62 that can be accessed by storage medium access device 64. Data storage medium 62 could, for example, be a magnetic medium such as a set of one or more tapes, diskettes, or floppy disks; an optical medium such as a set of one or more CD-ROMs; or any other appropriate medium for storing data.

Data storage medium 62 stores data that storage medium access device 64 can provide to processor 66. Processor 66 is connected for accessing memory 68, which can include program memory storing data indicating instructions processor 66 can execute and also data memory storing data processor 66 can access in executing the instructions.

Processor 66 is also connected for receiving data defining images from image input circuitry 70. The data could be obtained from facsimile (fax) machine 72; from scanner 74; from editor 76, which could be a forms editor or other interactive image editor controlled by user input devices such as a keyboard and mouse or a pen- or stylus-based input device; or from network 78, which could be a local area network or other network capable of transmitting data defining an image.

In addition to data storage medium 62, software product 60 includes data stored by storage medium 62. The stored data include data indicating image processing instructions 80, which processor 66 can execute to perform acts like those in FIG. 2. In executing instructions 80, processor 66 receives input image data defining an input image from image input circuitry 70. The input image shows an input graphical representation. Processor 66 uses the input image data to obtain category data indicating a category of graphical representations. Processor 66 then uses the category data to obtain content data indicating information represented by the input graphical representation's configuration. Processor 66 uses the content data to obtain output image data defining an output image that includes an output graphical representation in the indicated category with a configuration representing the indicated information.

Processor 66 can also be connected for providing the output image data to image output circuitry 90. The output image could show a more precisely formed version of an input sketch or could show a representation in the same generic category but in a different specific category, for example, or in a different generic category. The output image data could be provided to image output circuitry 90, and could in turn be provided to fax machine 92, to printer 94, to display 96, or to network 98.

The content data could also be used to provide control signals. For example, memory 68 could store control instructions processor 66 can execute to use the content data to obtain control data defining control signals. The control data could be provided to control output circuitry 100, which could respond by providing control signals to system 102.

Rather than being used immediately, content data could instead be stored in memory 68 for possible future use. This would be appropriate, for example, where the input image is one of a set and information indicating the operation to be performed on the set of images has not been obtained at the time data defining the input image is received.

C. Implementation

The general features described above could be implemented in numerous ways on various machines to analyze images showing graphical representations. One implementation analyzes images and uses the results to control a graphic rendering system.

1. Images Showing Graphical Representations

Figure 4:
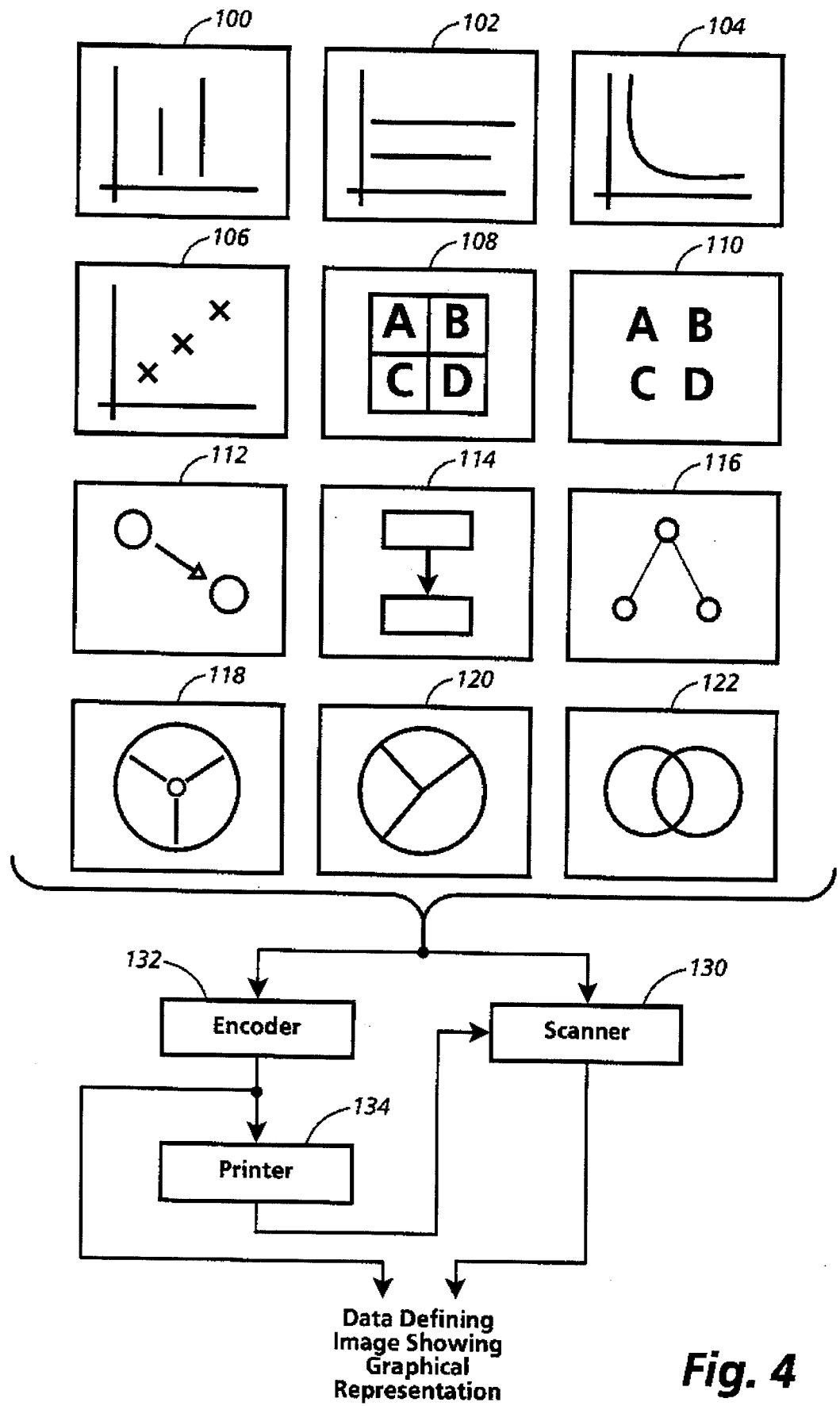
FIG. 4 is a schematic block diagram showing graphical representations in various categories and ways in which a user can provide data defining an image showing a graphical representation made by hand.
Figure 5:
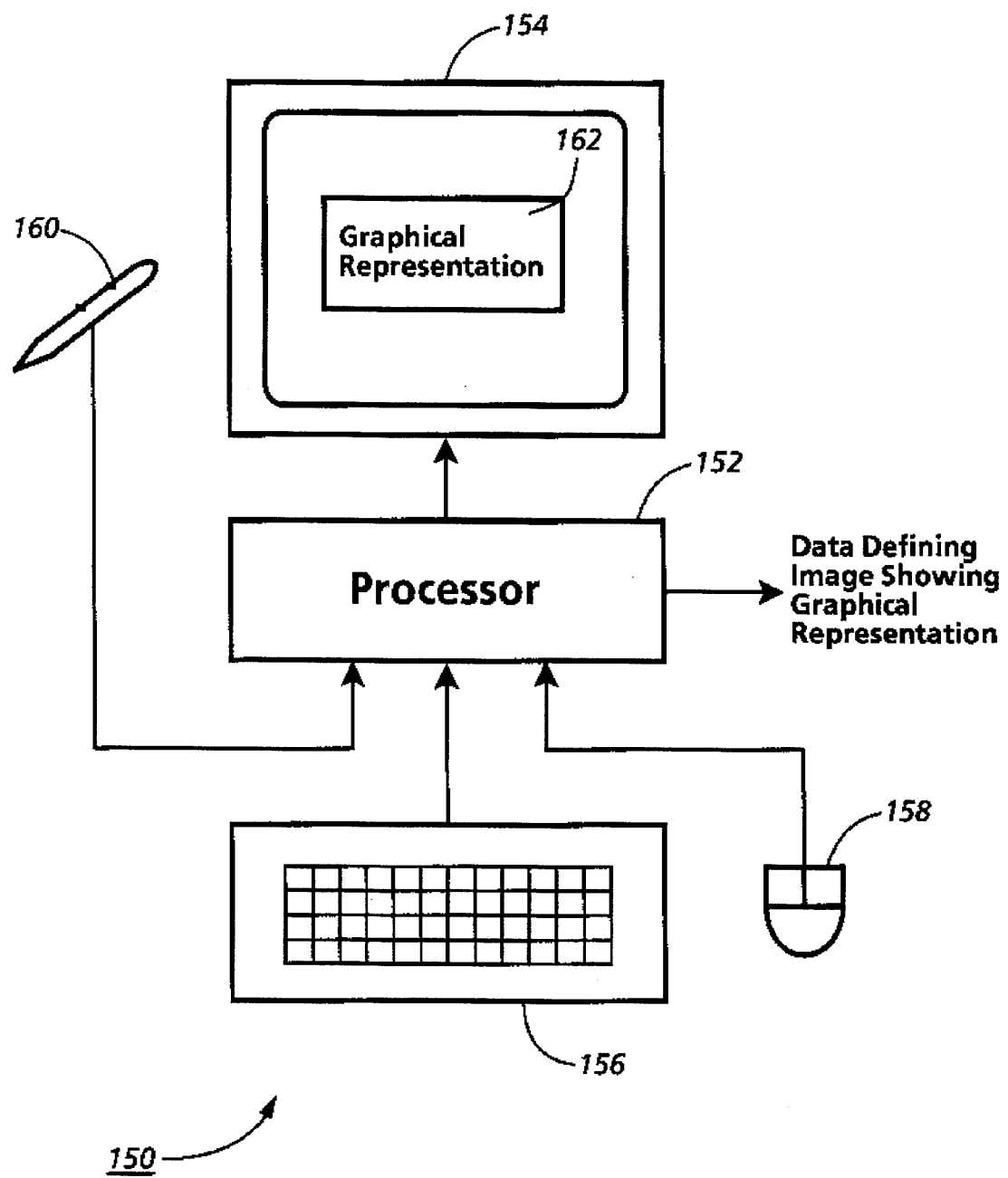
FIG. 5 is a schematic block diagram showing how a user can provide data defining an image showing a graphical representation produced interactively with a machine.

Data defining an image that shows a graphical representation can be obtained in many ways. FIG. 4 illustrates ways in which a user can provide an image showing a hand sketch of a graphical representation. FIG. 5 illustrates ways in which a user can provide an image showing a graphical representation by interacting with a machine.

FIG. 4 shows at left several examples of images showing graphical representations. Image 100 shows a vertical bar chart; image 102 a horizontal bar chart; image 104 a line graph; image 106 a scatter plot; image 108 a table; image 110 an array; image 112 a directed graph such as a state-transition diagram; image 114 a flow chart; image 116 a tree; image 118 a pie chart with a center component and with spokes that do not connect to the boundary or to the center component; image 120 a pie chart with spokes that connect to the boundary and to each other at the center; and image 122 a Venn diagram. Any of the images in FIG. 4 could be a human-produced image that shows a sketch made by marking actions performed on a marking medium by hand. Or the images could be obtained in any other appropriate way.

If the marking medium is a sheet, scanner 130 can receive the sheet. Scanner 130 operates on the sheet to provide data defining an image showing a graphical representation.

If the marking medium is a marking surface of an electronic device that can sense marks, encoder 132 can receive signals from the electronic device and use the signals to obtain data defining an image showing a graphical representation. This data can then be provided to printer 134 to obtain a sheet on which marks are printed, and this sheet can be provided to scanner 130. Scanner 130 provides data defining an image showing a graphical representation.

FIG. 4 also shows that data from encoder 132 could be used directly as data defining an image showing a graphical representation. This would be appropriate if encoder 132 could provide data defining an image in response to marking actions.

FIG. 5 shows machine 150, which could be a personal computer, a workstation, or another data processing system. Machine 150 includes processor 152; display 154; keyboard 156; pointing device 158, illustratively a mouse; and screen position indicating device 160, illustratively a stylus. A user can operate keyboard 156 and pointing device 158 to provide signals to processor 152. Or a user can perform marking actions with screen position indicating device 160 on the surface of display 154 to provide signals to processor 152. In response, processor 152 presents and modifies image 162 on display 154, so that the user can continue to provide signals until image 162 shows a desired graphical representation. Then the user can provide a signal requesting that processor 152 provide data defining image 162.

Processor 152 could execute a number of types of software to permit a user to produce an image in the manner described above. Processor 152 could execute document editing software or image editing software, for example.

In implementing the general features described above, an image showing a graphical representation could be produced in any of the ways shown in FIGS. 4 and 5 or in any other appropriate way. In producing an image of a graphical representation, a user can ensure that the representation satisfies a category constraint and a content constraint. A machine receiving data defining the image can then automatically obtain category data and content data by applying criteria or making measurements appropriate to the constraints.

2. Obtaining Category Data and Content Data

Figure 6:
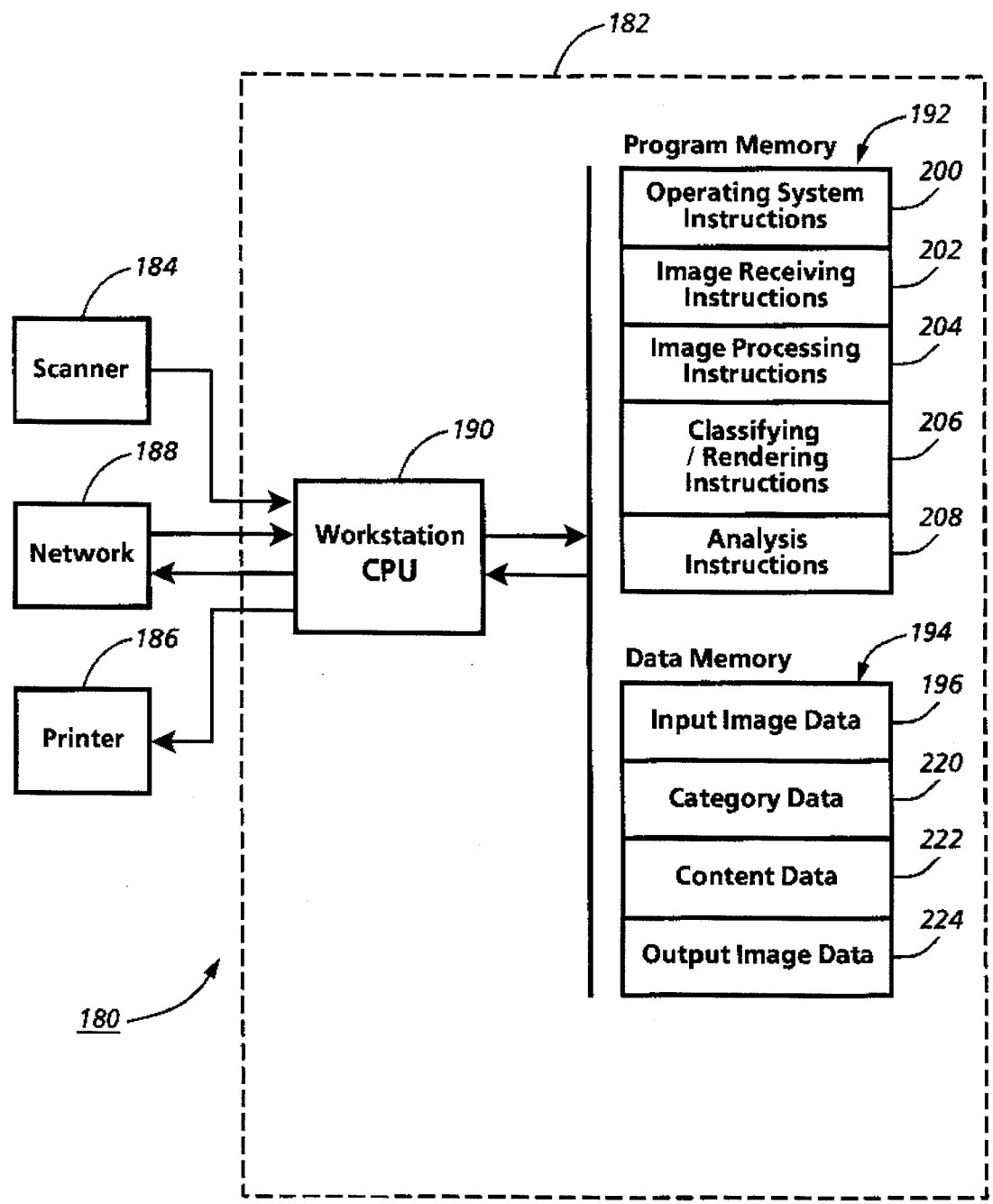
FIG. 6 is a schematic block diagram of a machine that can analyze an image showing a graphical representation.
Figure 7:
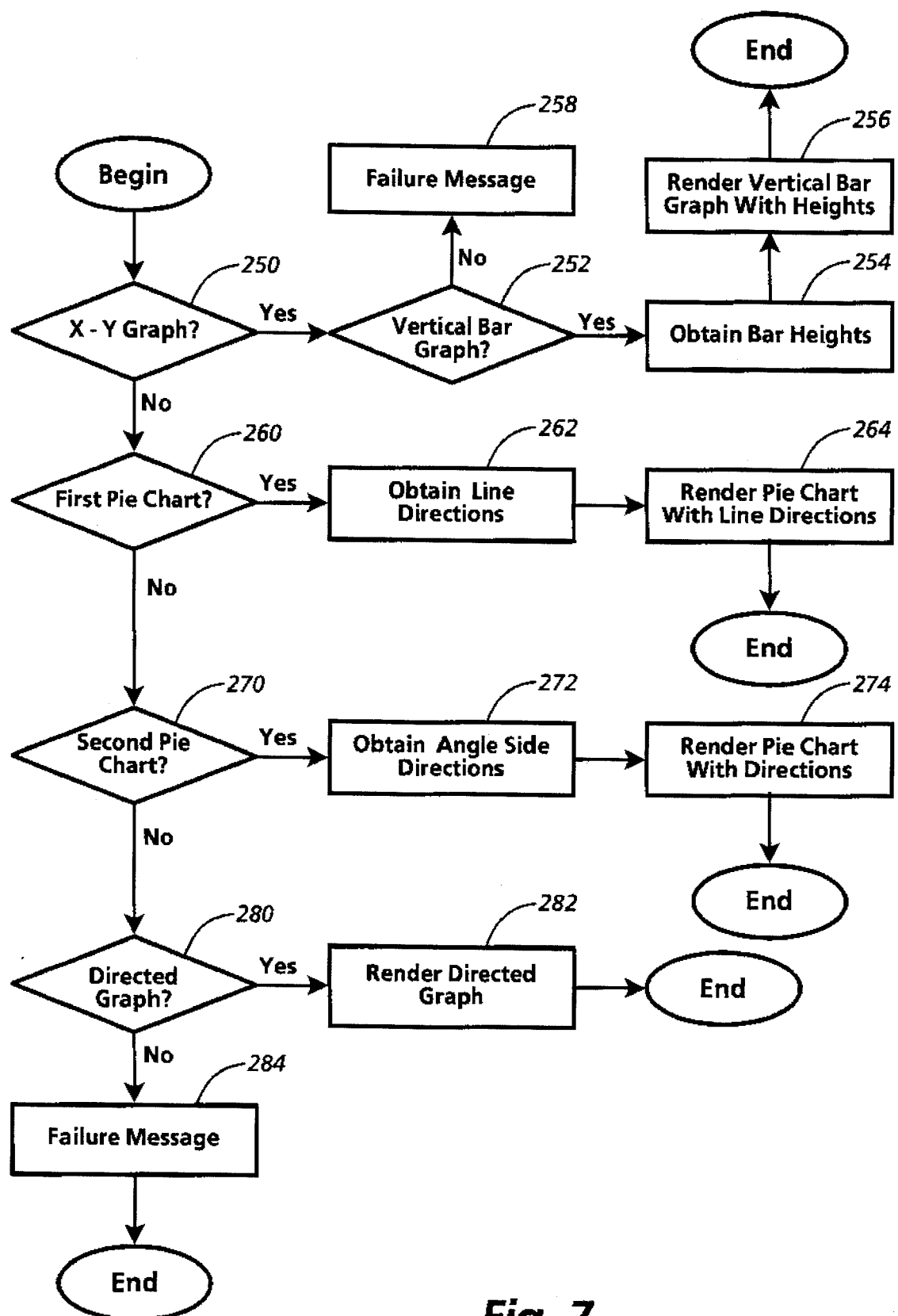
FIG. 7 is a flow chart of operations that can be performed by the machine of FIG. 6 in a first implementation.
Figure 8:
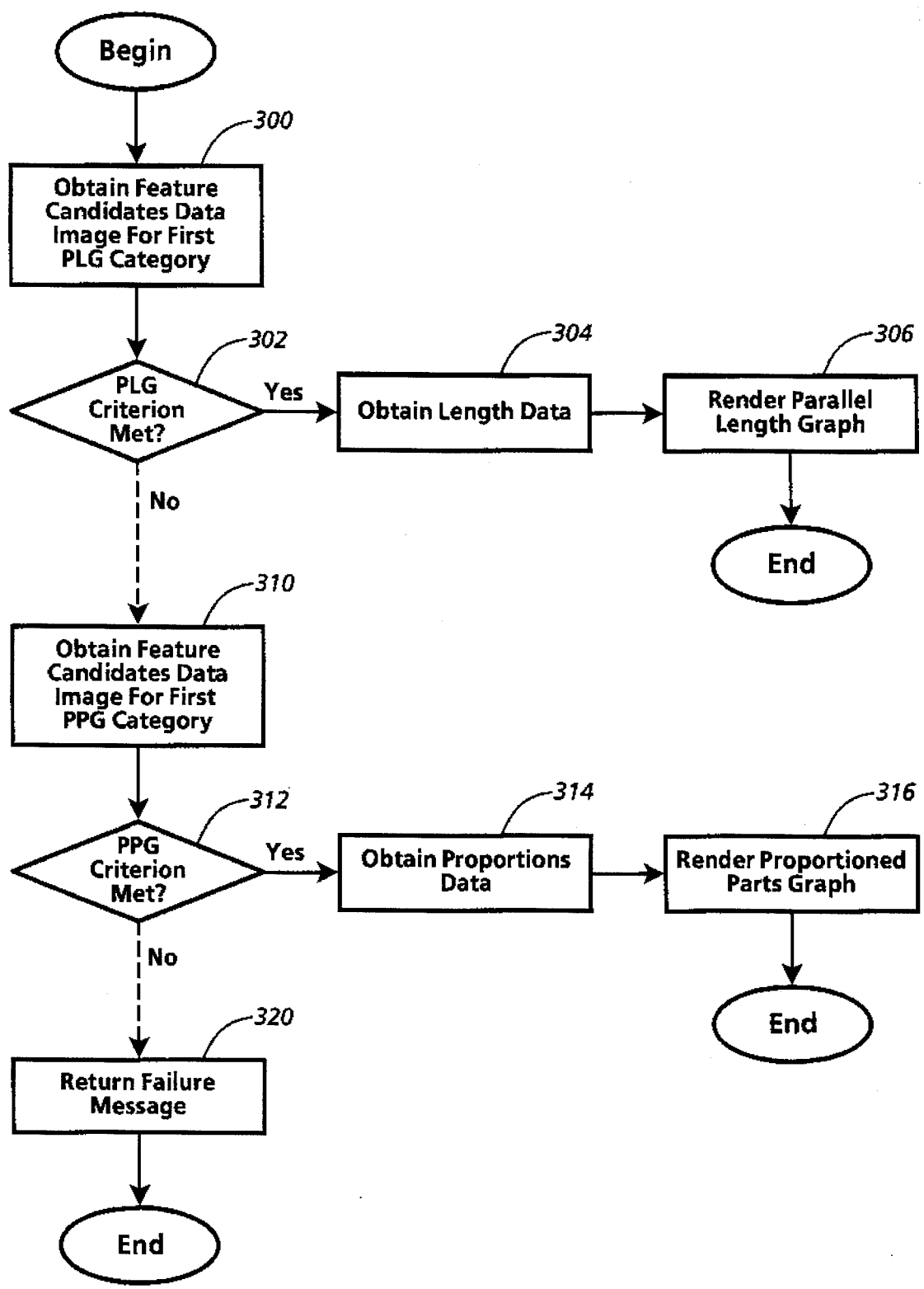
FIG. 8 is a flow chart of operations that can be performed by the machine of FIG. 6 in a second implementation.

FIG. 6 shows a system in which the general features described above have been implemented. FIG. 7 shows acts performed in executing classifying/rendering instructions in FIG. 6 in a first implementation. FIG. 8 shows acts performed in executing classifying/rendering instructions in FIG. 6 in a second implementation.

System 180 in FIG. 6 includes workstation 182, a Sun SPARCStation 10 workstation. Scanner 184 can be a conventional scanner such as a Datacopy GS Plus scanner. Printer 186 can be a conventional printer such as a Xerox laser printer. Network 188 can be a conventional network operating in accordance with a standard protocol, such as the Ethernet protocol.

Workstation CPU 190 is connected to receive data from scanner 184 and network 188 and is connected to provide data to printer 186 and network 188. For example, CPU 190 can receive data defining a human-produced image showing a hand sketch from scanner 184 as described above in relation to FIG. 4. Similarly, CPU 190 can receive data defining a human-produced image obtained in the manner described above in relation to FIG. 5 from network 188. In addition, workstation CPU 190 is connected to access program memory 192 and data memory 194 and other conventional workstation peripherals (not shown). Data memory 194 is illustratively storing input image data 196 defining an image showing a graphical representation.

Program memory 192 stores instructions CPU 190 can execute to perform operations implementing the general acts in FIG. 2. CPU 190 executes operating system instructions 200 that provide a Unix operating system or other appropriate operating system. Each of the other sets of instructions stored by program memory 192 can be obtained from source code in a conventional program language such as Lisp, C, or the like with conventional compiler or interpreter techniques. When executed, these other instructions make calls to operating system instructions 200 in a conventional manner. In general, the instructions can be obtained from source code in a conventional programming language such as Lisp, C, or the like with conventional compiler or interpreter techniques that produce object code. A machine can store data indicating the source code or the resulting object code on a data storage medium in manufacturing a software product as described above in relation to FIG. 3, with the source code or object code being stored for access by a storage medium access device when the software product is used in a machine like system 180.

In executing image receiving instructions 202, CPU 190 receives data defining an image and stores it in data memory 194, as illustrated by image data 196. The data defining the image may be received from scanner 184 or network 188.

In executing image processing instructions 204, CPU 190 can call classifying/rendering instructions 206. In executing classifying/rendering instructions 206, CPU 190 calls analysis instructions 208 to perform basic geometric analysis of the graphical representation shown in the image defined by input image data 196, producing category data 220 indicating a category of graphical representations, content data 222 indicating information represented by the graphical representation's configuration, and output image data 224 showing an output image with a graphical representation, in the indicated category or another category, and with a configuration representing the indicated information.

In general, the acts in FIGS. 7 and 8 have been implemented by operating on items of data, each defining an image. Each item is referred to as a "data image." Some data images can be used in obtaining others. In general, all of the data images define images with the same number of pixels, and each operation produces an image with the same number of pixels. An operation on two images typically uses values of pairs of pixels to produce, for each pair, a pixel value in an image being produced; within each pair, one pixel is from each image and the two pixels in the pair are both at the same location as the pixel value in the image being produced. Many examples of such operations are described in copending, coassigned U.S. patent application Ser. No.08/157,600, entitled "Analyzing an Image Showing a Node-Link Structure" ("the Node-Link Structure Application"), and in copending, coassigned U.S. patent application Ser. No. 08/157,804, entitled "Analyzing an Image Showing Editing Marks to Obtain Category of Editing Operation" ("the Editing Application"), both of which are incorporated herein by reference.

The act in box 250 in FIG. 7 begins by determining whether the graphical representation meets an X-Y graph criterion. If so, the act in box 252 determines whether the graphical representation meets a vertical bar graph criterion. If the graphical representation meets both criteria, it satisfies a constraint on vertical bar graphs. Therefore, the act in box 254 obtains content data indicating heights of bars in the bar graph, and the act in box 256 then renders a vertical bar graph using the heights from box 254. If the act in box 252 determines that the graphical representation is not a vertical bar graph, the act in box 258 provides a failure message, because the implementation cannot analyze other types of graphical representations that meet the X-Y graph criterion.

The acts in boxes 250, 252, 254, and 256 can be implemented as described in relation to FIG. 7 of copending, coassigned U.S. patent application Ser. No. 08/503,746, a continuation of copending, coassigned U.S. patent application Ser. No. 08/158,062, now abandoned, entitled "Analyzing an Image Showing a Parallel Length Graph" ("the Parallel Length Graph application"), incorporated herein by reference.

If the act in box 250 determines that the graphical representation does not meet the X-Y graph criterion, the act in box 260 determines whether the graphical representation meets a first pie chart criterion. If it meets this criterion, it satisfies a constraint on a first category of pie charts. If so, the act in box 262 obtains content data indicating directions in the pie chart, and the act in box 264 then renders a pie chart using the directions from box 262.

If the act in box 260 determines that the graphical representation does not meet the first pie chart criterion, the act in box 270 determines whether the graphical representation meets a second pie chart criterion. If it meets this criterion, it satisfies a constraint on a second category of pie charts. If so, the act in box 272 obtains content data indicating angle side directions in the pie chart, and the act in box 274 then renders a pie chart using the angle side directions from box 272.

The, acts in boxes 260, 262, 264, 270, 272, and 274 can be implemented as described in copending, coassigned U.S. patent application Ser. No. 08/157,600, entitled "Analyzing an Image Showing a Proportioned Parts Graph" ("the Proportioned Parts Graph Application"), incorporated herein by reference.

If the act in box 270 determines that the graphical representation does not meet the second pie chart criterion, the act in box 280 determines whether the graphical representation meets a directed graph criterion. If it meets this criterion, it satisfies a constraint on directed graphs. If so, the act in box 282 obtains content data indicating which connected components are vertices and edges in the directed graph and also renders a directed graph using the content data.

The acts in boxes 280 and 282 can be implemented as described in copending, coassigned U.S. patent application Ser. No. 08/157,856, entitled "Analyzing an Image Showing a Node-Link Structure" ("the Node-Link Structure Application"), incorporated herein by reference.

As set forth in the Node-Link Structure application, the act in box 280 can obtain category data indicating whether the graphical representation is a directed graph by determining whether the graphical representation meets a criterion for nodes and links. The act in box 280 can be implemented by obtaining a likely nodes data image and a likely links data image as described respectively in relation to boxes 250 and 254 in FIG. 7 of the Node-Link Structure Application, and by then iteratively obtaining a subset of the parts indicated in the likely nodes and likely links data image that satisfy a constraint on node-link structures, as described in relation to FIG. 8 of the Node-Link Structure Application. Then, the criterion for nodes and links can be applied as described in relation to box 470 in FIG. 12 of the Node-Link Structure Application.

The act in box 282 can be implemented using nodes and links obtained by the act in box 280, as described in relation to boxes 474 and 476 of FIG. 12 of the Node-Link Structure Application.

If the act in box 280 determines that the graphical representation does not meet the directed graph criterion, the act in box 284 provides a failure message, because the implementation illustrated in FIG. 7 cannot analyze graphical representations in other categories.

The implementation shown in FIG. 8 employs operations described in the Parallel Length Graph Application and the Proportioned Parts Graph Application to obtain category data indicating one of a number of categories of proportioned parts graphs and parallel length graphs. For each category, the implementation first obtains one or more feature candidates data images, then tests whether the feature candidates data images meet a criterion for the category. If so, the graphical representation satisfies a constraint for the category, so that the implementation obtains content data and renders a precisely formed graphical representation of the information in the content data.

Figure 10:
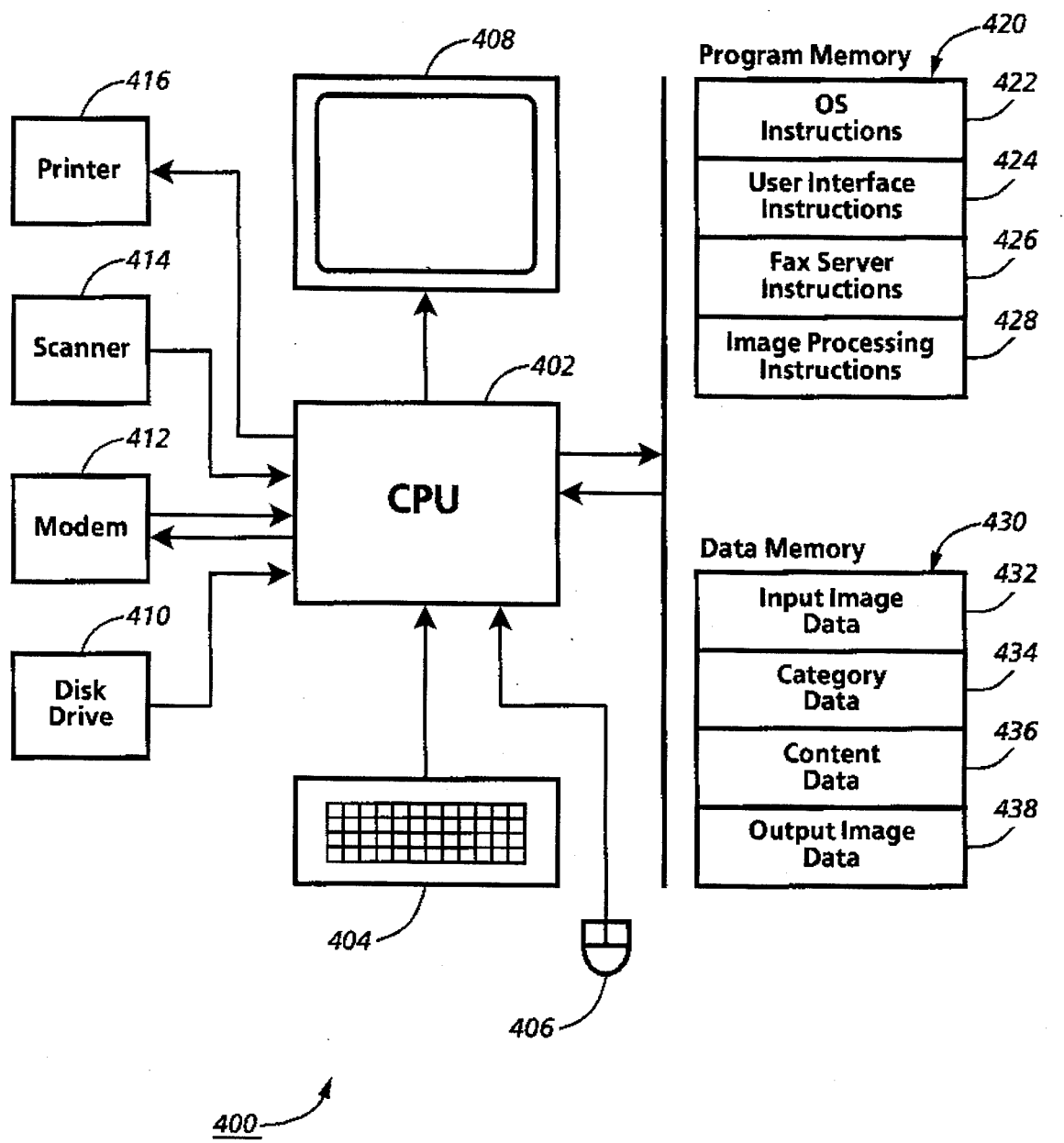
FIG. 10 is a schematic block diagram of a fax server application.

The act in box 300 begins by obtaining a feature candidates data image for the first parallel length graph (PLG) category, which can be implemented as described in relation to FIG. 10 of the Parallel Length Graph Application.

The act in box 302 applies a parallel length graph (PLG) criterion to the feature candidates data image. The act in box 302 can use the feature candidates data image to obtain a parallel feature data image showing feature candidates that meet an elongation criterion and a parallelism criterion, as described in relation to FIG. 9 of the Parallel Length Graph Application. The act in box 302 can then OR the parallel feature data image to determine whether any feature candidates meet the elongation and parallelism criteria. If so, the act in box 302 can obtain a bases data image, measure alignment of base points, and determine whether the alignment meets an alignment criterion, as described in relation to boxes 262, 264, and 270 in FIG. 8 of the Parallel Length Graph Application.

If the elongation, parallelism, and alignment criteria are all met, the graphical representation meets the PLG criterion. Therefore, the act in box 304 can obtain length data as described in relation to box 272 in FIG. 8 of the Parallel Length Graph Application. Then, the act in box 306 can use the length data to obtain a precisely formed parallel length graph, as described above in relation to FIG. 7.

As indicated by the dashed line, acts similar to those in boxes 302, 304, 306, and 308 can be performed for each of the other PLG categories, as described in relation to FIGS. 11–18 of the Parallel Length Graph Application.

The act in box 310 obtains a feature candidates data image for the first proportioned parts graph (PPG) category, which can be implemented as described in relation to FIG. 10 of the Proportioned Parts Graph Application.

The act in box 312 applies a proportioned parts graph (PPG) criterion to the feature candidates data image. The act in box 312 can use the feature candidates data image to obtain a segmented features data image showing feature candidates that meet either a direction units criterion or an angle units criterion, as appropriate for the PPG category as described in relation to FIG. 9 of the Proportioned Parts Graph Application. The act in box 312 can then test whether the feature segmented by direction units or into angle units includes two or more units, meeting a segment number criterion.

If one of the direction units or angle units criteria is met and the segment number criterion is met, the graphical representation meets the PPG criterion. Therefore, the act in box 314 can obtain proportions data as described in relation to box 264 in FIG. 8 of the Proportioned Parts Graph Application. Then, the act in box 316 can use the proportions data to obtain a precisely formed proportioned parts graph, as described above in relation to FIG. 7.

As indicated by the dashed line, acts similar to those in boxes 310, 312, 314, and 316 can be performed for each of the other PPG categories, as described in relation to FIGS. 11–15 of the Proportioned Parts Graph Application.

If the graphical representation neither meets any of the PLG criteria nor meets any of the PPG criteria, the act in box 320 returns a failure message, as in box 284 in FIG. 7.

The approach in FIG. 8 has been found to be quite useful for bar graphs: The grouping techniques described in copending, coassigned U.S. patent application Ser. No. 08/158,053, entitled "Analyzing an Image or Other Data to Obtain a Stable Number of Groups," incorporated herein by reference, can be used to easily group parts of an input image based on distance, size, elongation, and so forth, so that each grouping satisfies a constraint on bar candidates, as in box 300. The groupings can then be tested by applying a PLG criterion, as in box 302; an example of a PLG criterion is that the bars must be parallel to each other and their bases must be aligned.

The approach is also useful for some categories of pie charts: If a pie chart includes a component that provides a reference, such as the largest circular component, a center candidate that satisfies a center criterion and direction candidates or angle candidates can be easily obtained using the reference component, as in box 310. The candidates can then be tested by applying a PPG criterion, as in box 312. But if there is no reference component, as in FIG. 15 of the Proportioned Parts Graph Application, it may be difficult to obtain a center candidate and direction or angle candidates.

3. Variations

The implementations described above could be extended to cover additional categories by choosing appropriate models for the additional categories. Possible additional categories include Venn diagrams, line graphs, scatter plots, tables, matrices, arrays, undirected graphs, flow charts, trees, state-transition diagrams, and circuit diagrams. Copending, coassigned U.S. patent application Ser. No. 08/157,790, entitled "Analyzing an Image Showing a Perimeter Relationship Representation," incorporated herein by reference, describes techniques for analyzing perimeter relationship representations, such as Venn diagrams. Copending, coassigned U.S. patent application Ser. No. 08/157,782, entitled "Analyzing an Image Showing a Row/Column Representation," incorporated herein by reference, describes techniques for analyzing row/column representations, such as tables, matrices, and arrays.

The implementations described above use models that are implemented by procedures that determine whether a graphical representation is in each category. It may be advantageous, however, to use a database of models that can be accessed to obtain a category for a graphical representation. A user interface could be provided to allow a user to create additional models that could be added to the database, making the database user extensible. For example, the user might provide an image with a graphical representation that is an instance of a new category; the user might also provide a collection of additional images, each labeling a distinct component of the model of the new category and annotated with the salient parameters of the component. With a database, the sophistication of analysis could increase over time, allowing more varied and complex categories.

The implementations described in relation to FIGS. 7 and 8 can be inefficient, because they require extensive testing or verification to obtain category data indicating a category of graphical representation. The implementations described above might be made more efficient by adding an initial, quick test to determine specific categories whose constraints a graphical representation satisfies. A more rigorous verification operation for a generic category, as in FIGS. 7 and 8, could then be performed only if the generic category includes a specific category with constraints that the graphical representation satisfies. In one variation, the user might provide a small amount of code indicating, for a new specific category, an initial test and, if the technique of FIG. 8 is used, operations to obtain feature candidates to which a criterion for a generic category could be applied.

Unfortunately, however, initial experiments indicate that it may be difficult to find quick tests for some specific categories. It may also be difficult to find easy operations to obtain feature candidates for some specific categories. Therefore, it may prove advantageous to develop a general technique for obtaining data indicating parts of any graphical representation that satisfy a saliency constraint, then performing a rigorous verification operation for a generic category as in FIGS. 7 and 8, but only on the parts that satisfy the saliency constraint. The saliency constraint should be intuitive so that a user can understand it and apply it in creating new categories of graphical representations. This might enable automatic analysis of a new category of graphical representation, provided the relevant parts of the new category satisfy the saliency constraint and provided the new category fits within one of the generic categories for which a rigorous verification operation is available.

The implementations described above can operate on human-produced images showing graphical representations that satisfy certain constraints. A machine could be implemented to produce images satisfying the same constraints automatically, in which case the implementations could be applied to machine-produced imaged.

The implementations described above handle certain operations in a component-serial fashion, obtaining terminations or distances for each connected component separately and then combining the results. Most other operations are handled in component-parallel fashion. The mix of component-serial and component-parallel operations could be varied in any appropriate way; all operations could be component-parallel, all could be component-serial, or some could be component-parallel and others component-serial.

The implementations described above use currently available image processing techniques, but could readily be modified to use newly discovered image processing techniques as they become available. For example, component-parallel techniques for obtaining terminations and distances between connected components might be used instead of component-serial techniques; the component-parallel techniques might use Voronoi boundaries or Voronoi regions, for example, spreading minimum distances from locations on a Voronoi boundary.

The implementations described above operate on binary images, but could be extended to operate on color or gray scale images, either directly or after binarization.

The implementations described above use the results of image analysis to control rendering, but image analysis results could be used for a variety of other purposes. For example, the results of image analysis could be stored to preserve a graphical representation generated during a meeting using a tool such as a computer-controlled whiteboard device, for which user interface techniques are described in copending, coassigned U.S. patent application Ser. No. 08/394,919, a continuation of copending, coassigned U.S. patent application Ser. No. 07/869,554, now abandoned, entitled "Generalized Wiping as a User Interface for Object-Based Graphical Displays," and copending, coassigned U.S. Pat. No. 5,404,439, entitled "Time-Space Object Containment for Graphical User Interface," both incorporated herein by reference.

The rendering back ends of the implementations described above are based on a collection of PostScript code fragment templates, made interactively using the IDRAW program in the X window system. Examples of such code fragments include code to draw axes of an X-Y graph and code to draw a bar in a bar chart. Parameters of a graphical representation are automatically inserted into a PostScript code fragment template, and data defining an output image with a more precise version of the graphical representation is obtained by invoking a sequence of PostScript code fragments according to the structure of a category that applies to the graphical representation. This approach is compatible with many PostScript-based drawing/rendering programs. To make an interface to a new drawing system, one would simply perform interactive operations to obtain a collection of PostScript code fragment template files.

The implementations described above ignore characters and other marks within a graphical representation that are not part of the underlying graphical representation, such as labels and scale markings on axes. Labels could be cut and pasted into an output image. Or labels could be recognized using optical character recognition (OCR), and data indicating characters in the labels could be included in the data defining an output image.

One of the advantages of the implementations described above is that the user can draw a relatively simple sketch to indicate a relatively complicated graphical representation that can be rendered automatically in response to the sketch. Therefore, the sketch may not specify all the relevant parameters of the output image, making it necessary for parameters that are not specified to default sensibly. In the implementations described above, default parameters are supplied by rendering procedures. A user could instead provide defaults, such as in an initialization file. Defaults could be provided for specific categories and for specific rendering systems.

The implementations described above perform acts in a specific order that could instead be performed in another order. In FIGS. 7 and 8, for example, the categories could be recognized in any order.

Figure 9:
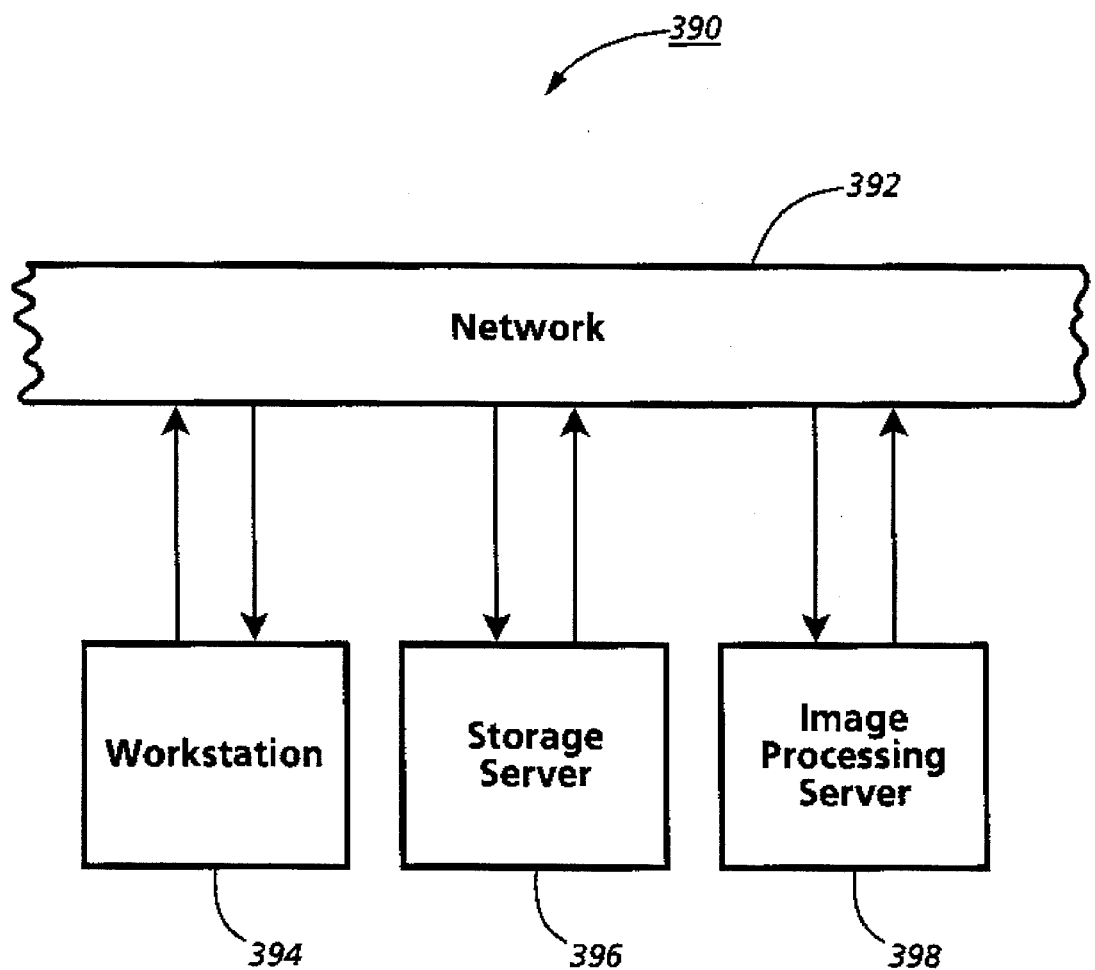
FIG. 9 is a schematic block diagram of an implementation with an image processing server.

The implementation described above in relation to FIG. 6 employs a workstation CPU that executes image processing instructions. FIG. 9 shows an alternative implementation that uses an image processing server. This implementation can provide the usual advantages of server architectures, including economy, speed, and sharing of resources.

System 390 in FIG. 9 includes network 392, workstation 394, storage server 396, and image processing server 398. A user can operate workstation 394 to provide requests on network 392 for storage of data defining images, such as from a scanner or other source. In response, storage server 396 can store the data. Then, the user can operate workstation 394 to provide requests for image processing operations like those described above. In response, image processing server 398 can perform the requested operations, executing instructions like those described above in relation to FIG. 6.

D. Application

The invention could be applied in many ways in a wide variety of machines.

The implementations described above provide a tool for rapidly assembling a nicely-rendered image of a graphical representation based on a hand-drawn sketch of the representation. A tool of this type would be useful, for example, for generating slides for a talk or for experimenting with the layout of a poster or an illustration page of a paper. Since the tool starts from a hand-drawn sketch, and, in the implementations described above, does not include recognition of characters or numerals, it produces precisely drawn images that are qualitatively accurate in content but may be quantitatively inaccurate. Data defining an image produced in this manner could be subsequently edited by the user to turn a qualitatively accurate illustration into a quantitatively accurate one.

Figure 11:
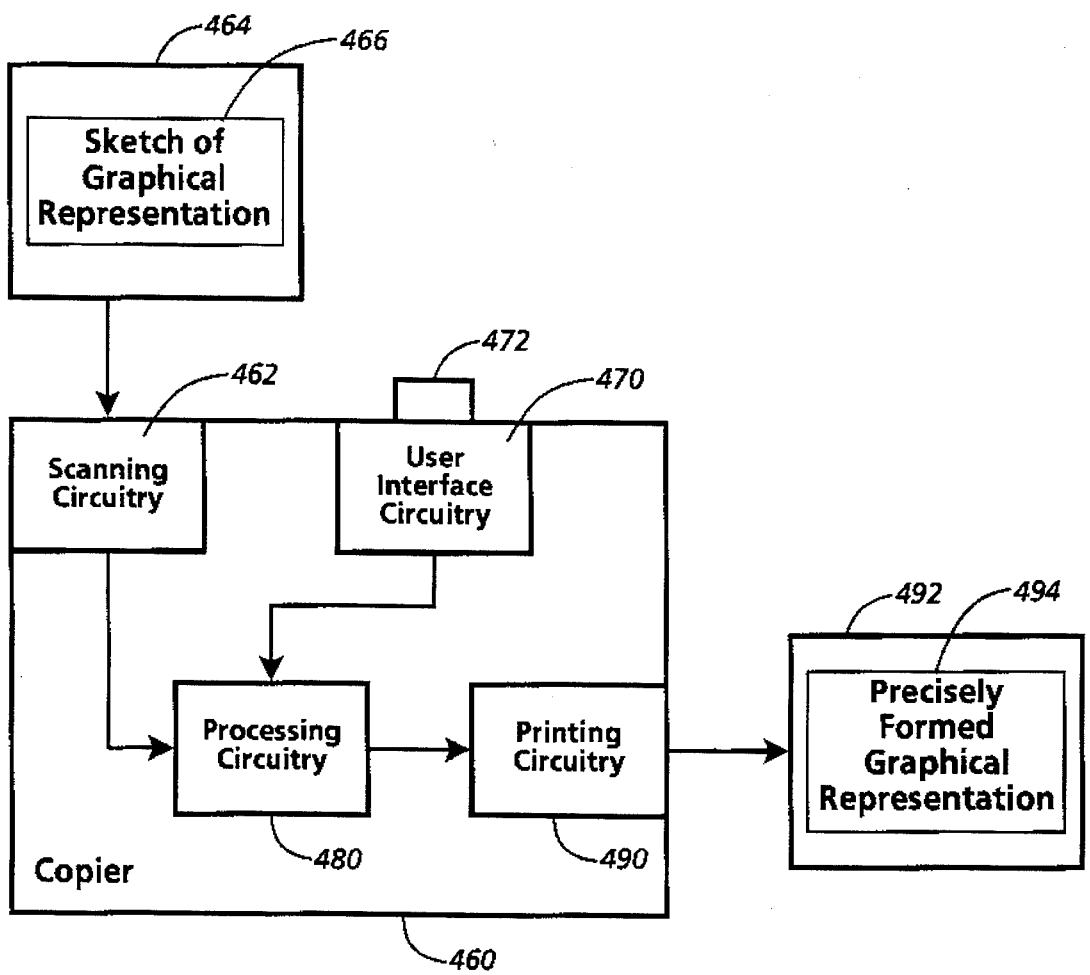
FIG. 11 is a schematic block diagram of a copier application.

FIG. 10 shows how the invention could be applied in a personal computer that can operate as a fax server. FIG. 11 illustrates how the invention could be applied in a copier.

System 400 in FIG. 10 includes CPU 402, which can be the CPU of a personal computer such as an IBM PC compatible machine. CPU 402 is connected to receive user input signals from keyboard 404 and mouse 406, and can present images to a user through display 408. CPU 402 is also connected to a number of other peripheral devices, illustratively including disk drive 410, modem 412, scanner 414, and printer 416.

Program memory 420 stores operating system (OS) instructions 422, which can be a version of DOS; user interface instructions 424; fax server instructions 426; and image processing instructions 428. Fax server instructions 426 can be similar to the PaperWorks™ software product described in copending, coassigned U.S. patent application Ser. No. 08/543,232, a continuation of copending, coassigned U.S. patent application Ser. No. 08/096,198, now abandoned, entitled "Data Access Based on Human-Produced Images," incorporated herein by reference. Image processing instructions 428 can image processing instructions 204, classifying/rendering instructions 206, and analysis instructions 208 as described above in relation to FIG. 6, and can be called by fax server instructions 426 to perform image analysis. Fax server instructions 426 and image processing instructions 428 could be obtained in the form of a software product stored on a floppy disk, diskette, or CD-ROM, and accessed for storage in program memory 420 by disk drive 410.

Data memory 430 stores input image data 432, category data 434, content data 436, and output image data 438 as described above in relation to FIG. 6.

System 400 can obtain image data 432 defining an image that shows a graphical representation in many ways: Data defining an image showing a graphical representation could be produced interactively as described above in relation to FIG. 5, such as by executing user interface instructions 424. Any appropriate user interface techniques could be used, including pen-based techniques. Data defining a previously produced image showing a graphical representation could be retrieved from a storage medium by disk drive 410. Data defining an image showing a graphical representation could be obtained from scanner 414 as described above in relation to FIG. 4. A user could produce data defining an image showing a graphical representation elsewhere and provide it to system 400 through modem 412, such as by making a facsimile transmission to modem 412.

CPU 402 could execute fax server instructions 426 in response to a request received by facsimile transmission through modem 412. The request could include a form indicating an image processing operation and also indicating an output image destination such as a fax machine or printer 416. The request could also include data defining an image showing a graphical representation or could indicate an image previously obtained by system 400.

Fax server instructions 426 could include calls to image processing instructions 428 to perform acts like those shown in FIG. 7 or FIG. 8. Execution of fax server instructions 426 could further provide data defining a rendered image produced in one of boxes 256, 264, 274, or 282 in FIG. 7 or in one of boxes 306 or 316 in FIG. 8. The data defining the rendered image could be provided to modem 412 for facsimile transmission or to printer 416 for printing.

The implementations described above are especially well suited to offline image analysis as in FIG. 10 because speed of analysis matters less for offline analysis than it would for online analysis. Also, reliability may matter more for offline analysis than it would for online analysis. As illustrated in FIG. 11, however, the implementations described above may also be applied in online analysis, such as in a copier.

In FIG. 11, copier 460 can be a digital copier or other electronic reprographics system. Scanning circuitry 462 obtains data defining image 464 showing sketch 466 of a graphical representation. User interface circuitry 470 includes touch sensing device 472, which can be a push button, a heat or pressure sensitive element, a capacitance sensing element, or other device for sensing a touching action. When a user touches device 472, user interface circuitry 470 provides touch data indicating that device 472 has been touched.

Processing circuitry 480 uses the touch data to obtain image analysis request data indicating a request for an image processing operation. Then, responding to the request, processing circuitry 480 uses data defining image 464 to automatically obtain category data indicating a category of graphical representations. Processing circuitry 480 then uses the category data and the data defining image 464 to automatically obtain content data indicating information indicated by sketch 466. Processing circuitry 480 then uses the content data to automatically obtain data defining a rendered image that includes a graphical representation in the category indicated by the category data but more precisely formed than sketch 466. This data is provided to printing circuitry 490 for printing of image 492 with precisely formed graphical representation 494.

The invention could also be applied in combination with other techniques, including those described in copending coassigned U.S. Pat. No. 5,455,889, entitled "Analyzing an Image Showing a Graphical Representation of a Layout," and copending, coassigned U.S. patent application Ser. No. 08/157,804, entitled "Analyzing an Image Showing Editing Marks to Obtain Category of Editing Operation," both incorporated herein by reference.

E. Miscellaneous

The invention has been described in relation to implementations that analyze human-produced images. The invention might also be implemented to analyze other types of images showing graphical representations, by using appropriate criteria to obtain data indicating a category of graphical representations and by using the category to obtain data indicating a graphical representation's content.

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method comprising:

obtaining input image data defining an input image showing an input graphical representation whose configuration represents information;

using the input image data to obtain category data distinct from the image input data by determining a category of graphical representations from among a plurality of accepted categories of graphical representations, the category data indicating the category of graphical representations thus determined;

using the category data to obtain content data indicating information represented by the configuration of the input graphical representation; and using the content data to obtain output image data defining an output image that includes an output graphical representation, the output graphical representation having a configuration representing the information indicated by the content data.

2. The method of claim 1 in which the output graphical representation is an instance of the category indicated by the category data.

3. The method of claim 1 in which the input image is a human-produced image.

4. The method of claim 3 in which the human-produced image shows a sketch of the input graphical representation, the sketch being made by hand; the output graphical representation being more precisely formed than the input graphical representation.

5. The method of claim 1 in which the act of using the input image data to obtain category data comprises, for each category of the plurality of accepted categories of graphical representations:

using the input image data to obtain feature candidate data indicating parts of the input image that meet a criterion;

using the feature candidate data to determine whether the input graphical representation satisfies a constraint on the category; and if the input graphical representation satisfies the constraint, obtaining category data indicating the category.

6. The method of claim 1 in which the input graphical representation is an instance of the category indicated by the category data, and in which the category indicated by the category data is a generic category of graphical representations that includes a set of two or more specific categories of graphical representations; the act of using the input image data to obtain category data comprising, for each of the specific categories:

using the input image data to obtain specific data indicating parts of the input image that meet a specific category criterion;

using the specific data to obtain generic data indicating parts of the input image that meet the specific category criterion and also meet a generic category criterion; and using the generic data to obtain the category data; the category data indicating whether a sufficient number of parts of the input image meet both the specific category criterion and the generic category criterion; the category data indicating the specific category only if the sufficient number of parts of the input image meet both the specific category criterion and the generic category criterion.

7. The method of claim 6 in which the input graphical representation is an instance of a first one of the specific categories; the output graphical representation also being an instance of the first specific category.

8. The method of claim 6 in which the input graphical representation is an instance of a first one of the specific categories; the output graphical representation being an instance of the generic category but not of the first specific category.

9. The method of claim 1 in which the category data indicate a category selected from the group consisting of X-Y graph, vertical bar graph, two categories of pie chart, and directed graph.

10. The method of claim 1 in which the category data indicate one of a set of categories that includes two or more categories of bar graph and two or more categories of pie chart.

11. The method of claim 1 in which the category data indicate a category selected from the group consisting of directed graph, undirected graph, bar graph, pie chart, line graph, scatter plot, circuit diagram, flow chart, Venn diagram, state-transition diagram, tree, table matrix, and array.

12. A method of operating a machine that includes:

image input circuitry for obtaining data defining images as input; and a processor connected for receiving data defining images from the image input circuitry;

the method comprising:

operating the processor to receive input image data from the image input circuitry, the input image data defining an image that shows an input graphical representation whose configuration represents information; operating the processor to use the input image data to obtain category data distinct from the image input data by determining a category of graphical representations from among a plurality of accepted categories of graphical representations, the category data indicating the category of graphical representations thus determined;

operating the processor to use the category data to obtain content data indicating information represented by the configuration of the input graphical representation; and operating the processor to use the content data to obtain output image data defining an output image that includes an output graphical representation, the output graphical representation having a configuration representing the information indicated by the content data.

13. The method of claim 12 in which the machine further includes image output circuitry for providing data defining images as output; the method further comprising:

providing the output image data to the image output circuitry.

14. A machine comprising:

image input circuitry for obtaining data defining images as input;

memory for storing data; and a processor connected for receiving data defining images from the image input circuitry and connected for accessing data stored in the memory;

the data stored in the memory comprising instruction data indicating image processing instructions the processor can execute; the processor, in executing the image processing instructions:

receiving input image data from the image input circuitry, the input image data defining an image that shows an input graphical representation whose configuration represents information;

using the input image data to obtain data distinct from the image input data by determining a category of graphical representations from among a plurality of accepted categories of graphical representations, the category data indicating the category of graphical representations thus determined; and using the category data to obtain content data indicating information represented by the configuration of the input graphical representation; and using the content data to obtain output image data defining an output image that includes an output graphical representation, the output graphical representation having a configuration representing the information indicated by the content data.

15. The machine of claim 14 in which the input image circuitry is connected for receiving facsimile transmissions.

16. The machine of claim 14 in which the machine further comprises image output circuitry for providing data defining images as output; the processor further, in executing the image processing instructions:

providing the output image data to the image output circuitry.

17. The machine of claim 16 in which the output image circuitry is connected for providing facsimile transmissions.

18. The machine of claim 14 in which the machine is an image processing server; the image processing server being connected to a network for receiving requests for image processing operations; the network including the image input circuitry; the instruction data further indicating request handling instructions the processor can execute; the processor, in executing the request handling instructions, determining whether to execute the image processing instructions.

19. The machine of claim 14 in which the machine is a fax server.

20. The machine of claim 14 in which the machine is a copier.

21. An article of manufacture for use in a machine that includes:

image input circuitry for obtaining data defining images as input;

a storage medium access device for accessing a medium that stores data; and a processor connected for receiving data defining images from the image input circuitry; the processor further being connected for receiving data from the storage medium access device;

the article comprising:

a storage medium that can be accessed by the storage medium access device when the article is used in the machine; and data stored by the storage medium so that the storage medium access device can provide the stored data to the processor when the article is used in the machine; the stored data comprising instruction data indicating instructions the processor can execute; the processor, in executing the instructions:

receiving input image data from the image input circuitry, the input image data defining an image that shows an input graphical representation whose configuration represents information;

using the input image data to obtain category data distinct from the image input data by determining a category of graphical representations from among a plurality of accepted categories of graphical representations, the category data indicating the category of graphical representations thus determined; and using the category data to obtain content data indicating information represented by the configuration of the input graphical representation; and using the content data to obtain output image data defining an output image that includes an output graphical representation, the output graphical representation having a configuration representing the information indicated by the content data.

22. A method comprising:

obtaining input image data defining an input image showing an input graphical representation whose configuration represents information;

using the image input data to obtain category data distinct from the image input data, the category data indicating an explicit determination of an accepted category of graphical representations;

using the category data to obtain content data indicating information represented by the configuration of the input graphical representation; and using the content data to obtain output image data defining an output image that includes an output graphical representation, the output graphical representation having a configuration representing the information indicated by the content data.

23. The method of claim 22 wherein the input graphical representation is made by hand.

24. The method of claim 22 wherein the input graphical representation is a two-dimensional graph.

25. The method of claim 22 wherein the accepted category of graphical representations is selected from the group consisting of X-Y graph, directed graph, undirected graph, bar graph, pie chart, line graph, scatter plot, circuit diagram, flow chart, Venn diagram, state-transition diagram, tree, table, matrix, and array.

* * * * *